(12) United States Patent
Jing et al.

(10) Patent No.: US 8,687,553 B2
(45) Date of Patent: *Apr. 1, 2014

(54) MULTI-TIER WIRELESS HOME MESH NETWORK WITH A SECURE NETWORK DISCOVERY PROTOCOL

(75) Inventors: Xiangpeng Jing, San Diego, CA (US); Abhishek Patil, San Diego, CA (US); Aixin Liu, San Diego, CA (US); Djung N. Nguyen, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 142 days.

This patent is subject to a terminal disclaimer.

(21) Appl. No.: 13/102,976

(22) Filed: May 6, 2011

(65) Prior Publication Data

US 2011/0211566 A1 Sep. 1, 2011

Related U.S. Application Data

(63) Continuation of application No. 12/360,821, filed on Jan. 27, 2009, now Pat. No. 7,961,674.

(51) Int. Cl.
*H04Q 7/00* (2006.01)

(52) U.S. Cl.
USPC ............................. 370/328; 370/329; 370/254

(58) Field of Classification Search
USPC ......... 370/328, 329, 254, 338, 331, 390, 312, 370/465; 709/217, 200, 227; 725/32, 109
See application file for complete search history.

(56) References Cited

U.S. PATENT DOCUMENTS

| | | | |
|---|---|---|---|
| 4,890,323 | A | 12/1989 | Beker et al. |
| 5,303,388 | A | 4/1994 | Kreitman et al. |
| 6,581,166 | B1 | 6/2003 | Hirst et al. |

(Continued)

FOREIGN PATENT DOCUMENTS

| | | |
|---|---|---|
| EP | 1912147 | 4/2008 |
| KR | 100499122 | 7/2005 |

(Continued)

OTHER PUBLICATIONS

U.S. Appl. No. 12/367,184, Non-Final Office Action, mailed May 4, 2012.
U.S. Appl. No. 12/360,771, Non-Final Office Action, mailed Mar. 9, 2012.
"United States Patent and Trademark Office—Non-Final Office Action Dated Aug. 24, 2010", U.S. Appl. No. 12/402,413.

(Continued)

*Primary Examiner* — Chuong T Ho
(74) *Attorney, Agent, or Firm* — Blakely, Sokoloff, Taylor & Zafman LLP

(57) ABSTRACT

An apparatus and method for a multi-tier wireless home mesh network is described. The method may include formation of an infrastructure-less wireless home mesh networking environment comprising a collection of nodes that operate as a decentralized, ad hoc wireless network with multiple sub-networks or tiers that are responsible for different functions within the network. Each node of the multi-tier network is configured to forward data to other nodes and is assigned to a particular tier based on the node's performance capabilities. A further embodiment includes identification of a wireless home mesh network. Once identified, one or more proprietary messages may be exchanged in a secure manner to establish connections with a home electronics device as either a mobile node or a stationary node of the home network. A home electronics device may wirelessly communicate to route data within one or more nodes of the wireless home mesh network. Other embodiments are described and claimed.

3 Claims, 8 Drawing Sheets

(56) References Cited

U.S. PATENT DOCUMENTS

| | | | |
|---|---|---|---|
| 6,842,460 B1 | 1/2005 | Olkkonen et al. | |
| 6,879,574 B2 | 4/2005 | Naghian et al. | |
| 7,042,988 B2 | 5/2006 | Juitt et al. | |
| 7,069,483 B2 | 6/2006 | Gillies et al. | |
| 7,092,715 B2 | 8/2006 | Korpela et al. | |
| 7,184,767 B2 | 2/2007 | Gandolfo | |
| 7,366,113 B1 | 4/2008 | Chandra et al. | |
| 7,403,492 B2 | 7/2008 | Zeng et al. | |
| 7,408,911 B2 | 8/2008 | Joshi | |
| 7,443,809 B2 | 10/2008 | Bajic | |
| 7,505,751 B1 | 3/2009 | Backes | |
| 7,554,998 B2 | 6/2009 | Simonsson et al. | |
| 7,586,888 B2 | 9/2009 | Wang | |
| 7,623,501 B2 | 11/2009 | Rangarajan et al. | |
| 7,822,064 B2 | 10/2010 | Thubert et al. | |
| 7,961,674 B2 * | 6/2011 | Jing et al. | 370/328 |
| 8,130,704 B2 * | 3/2012 | Jing et al. | 370/328 |
| 2004/0103295 A1 | 5/2004 | Gustafsson | |
| 2004/0174900 A1 | 9/2004 | Volpi et al. | |
| 2004/0174904 A1 | 9/2004 | Kim et al. | |
| 2004/0233855 A1 | 11/2004 | Gutierrez et al. | |
| 2004/0235468 A1 | 11/2004 | Luebke et al. | |
| 2004/0249817 A1 | 12/2004 | Liu et al. | |
| 2005/0113070 A1 | 5/2005 | Okabe | |
| 2005/0138359 A1 | 6/2005 | Simon et al. | |
| 2005/0201393 A1 | 9/2005 | Hatayama et al. | |
| 2005/0250473 A1 | 11/2005 | Brown et al. | |
| 2006/0094401 A1 | 5/2006 | Eastlake | |
| 2006/0161778 A1 | 7/2006 | Stirbu et al. | |
| 2006/0171540 A1 | 8/2006 | Lee et al. | |
| 2006/0215593 A1 * | 9/2006 | Wang et al. | 370/315 |
| 2006/0256733 A1 | 11/2006 | Bejerano | |
| 2007/0050129 A1 | 3/2007 | Salmre | |
| 2007/0081543 A1 | 4/2007 | Brenes et al. | |
| 2007/0104215 A1 | 5/2007 | Wang et al. | |
| 2007/0127503 A1 | 6/2007 | Zhao | |
| 2007/0147241 A1 | 6/2007 | Wang et al. | |
| 2007/0178884 A1 * | 8/2007 | Donovan et al. | 455/411 |
| 2007/0195702 A1 | 8/2007 | Yuen et al. | |
| 2007/0200914 A1 | 8/2007 | Du Mas et al. | |
| 2007/0230438 A1 | 10/2007 | Jayapalan et al. | |
| 2007/0254677 A1 | 11/2007 | Venkitaraman et al. | |
| 2008/0037442 A1 | 2/2008 | Bill | |
| 2008/0039130 A1 | 2/2008 | Acampora | |
| 2008/0112363 A1 * | 5/2008 | Rahman et al. | 370/331 |
| 2008/0112371 A1 | 5/2008 | Joshi | |
| 2008/0227462 A1 * | 9/2008 | Freyman et al. | 455/456.1 |
| 2009/0022115 A1 * | 1/2009 | Berzin et al. | 370/338 |
| 2009/0147702 A1 | 6/2009 | Buddhikot et al. | |
| 2009/0213824 A1 | 8/2009 | Chen | |
| 2009/0303902 A1 | 12/2009 | Liu et al. | |
| 2009/0303921 A1 | 12/2009 | Manchanda et al. | |
| 2010/0080200 A1 | 4/2010 | Stewart | |
| 2010/0083303 A1 | 4/2010 | Redei et al. | |
| 2010/0188971 A1 * | 7/2010 | Chiang | 370/225 |
| 2010/0189011 A1 | 7/2010 | Jing et al. | |
| 2010/0191968 A1 | 7/2010 | Patil et al. | |
| 2010/0271945 A1 | 10/2010 | Clave et al. | |
| 2010/0283579 A1 | 11/2010 | Kraus et al. | |
| 2011/0021150 A1 | 1/2011 | Lin | |
| 2011/0211565 A1 * | 9/2011 | Jing et al. | 370/338 |

FOREIGN PATENT DOCUMENTS

| | | |
|---|---|---|
| WO | 2004017552 | 2/2004 |
| WO | 2005109754 | 2/2005 |
| WO | WO-2006098723 | 9/2006 |
| WO | 2008002718 | 1/2008 |

OTHER PUBLICATIONS

International Search Report and Written Opinion of the International Searching Authority Dated Aug. 5, 2010, International Application No. PCT/US2010/021082.
United States Patent and Trademark Office—Non-Final Office Action Dated Aug. 19, 2010, U.S. Appl. No. 12/360,821.
United States Patent and Trademark Office—Non-Final Office Action Dated Jan. 20, 2011, U.S. Appl. No. 12/791,386.
"United States Patent and Trademark Office—Final Office Action Dated Jun. 24, 2011", U.S. Appl. No. 12/791,386.
*Auto IP Collision Detection and Resolution for Multi-Hop Sony Mesh Network with Link Failures* (*Sony Electronics Proprietary*) 1 page.
*Auto IP Slide Show* (*Sony Electronics Proprietary*) 5 pages.
PCT/US2010/021082 Notification Concerning Transmittal of International Preliminary Report on Patentability (Chapter 1 of the Patent Cooperation Treaty); Date of mailing Aug. 11, 2011.
International Search Report and Written Opinion of the International Searching Authority Dated Oct. 12, 2010, International Application No. PCT/US2010/023242.
International Search Report and Written Opinion of the International Searching Authority Dated Aug. 23, 2010, International Application No. PCT/US2010/021685.
United States Patent and Trademark Office—Office Action Dated Oct. 4, 2011, U.S. Appl. No. 12/367,184.
Benveniste, Mathilde, "Express Forwarding: A Distributed QoS MAC Protocol for Wireless Mesh", *MESH 2008*, Cap Esteral, France.
Ellison, Carla M., :"Home Security" *Intel Technology Journal*, Nov. 12, 2002, vol. 6, issue 4, pp. 37-48, ISSN 1535-766X. See pp. 39, 41-42, 46-47.
Hong, et al., "A Base-station Centric Data Gathering Routing Protocol in Sensor Networks Useful in Home Automation Applications," *IEEE Transactions on Consumer Electronics*, vol. 53, Issue 3, Aug. 2007, pp. 945-951 (Abstract only, 1 page).
Hubaux, Jean-Pierre, *Peer-to-Per security in Wireless Ad Hoc Networks* pp. 1-45 EPFL—Eroffnungskolloquium des Sonderforschungsbereich 627 Nexus, htt://LCAWWW.epfl.ch/hubaux/Talks/Stuttgart.ppt.
Johnson, et al., "DSR: The Dynamic Source Routing Protocol for Multi-Hop Wireless Ad Hoc Networks", *Ad Hoc Networking*, Charles Perkins, ed., Chapter 5, pp. 139-172, Addison-Wesley 2001.
Naouel, Ben S., et al., "Secure Wireless Mesh Networks", Laboratory of Computer Communications and Applications (LCA), Apr. 6, 2006, p. 1-10 (4), *EPFL*—Lausanne, Switzerland, http://www.ele.uri.edu/next/readinglist/Securing_Wireless_Mesh_Networks.pdf.
Peng, et al., "A Wireless MAC Protocol with Collision Detection", *IEEE Transactions on Mobile Computing*, vol. 6, No. 12, Dec. 2007, pp. 1357-1369.
Shai, Halevi, et al., "Public-Key Cryptography and Password Protocols." *ACM Transactions on Information and System Security*, Aug. 1999, vol. 2, No. 3, pp. 230-268, See figs. 1-2, and pp. 239-242.
Souryal, Michael R., et al., "Real-Time Deployment of Multihop Relays for Range Extension", Wireless Communication Techologies Group, *National Institute of Standards and Technology*, Gaithersburg, MD, US, 2007 copyright Association for Computing Machinery, pp. 85-98.
Tang, Helen, et al., "Strong Authentication for Tactical Mobile Ad Hoc Networks", Jul. 2007, pp. 1-53, *Defence R&D* Cananda—Ottawa: Technical Memorandum DRDC Ottawa TM 2007-146.
Office Action for Japanese application JP 2011-548033 dated May 14, 2013 (with English translation).
Halevi, Shai et al., "Public-Key Cryptography and Password Prtocols", ACM Transactions on Information and System Security, vol. 2, No. 3, Aug. 1999, pp. 230-268.
Aljindi, Mohamad et al., "Autonomic Security for Home Networks", First International Workshop, IWSOS 2006 and Third International Workshop on New Trends in Network Architectures and Services, EuroNGI 2006 Passau, Germany, Sep. 2006, Proceedings.
United States Patent and Trademark Office—Office Action (U.S. Appl. No. 13/191,328) dated Apr. 1, 2013.
United States Patent and Trademark Office—Office Action (U.S. Appl. No. 12/360,771) dated Aug. 10, 2012.
Office Action dated Jul. 8, 2013 for U.S. Appl. No. 13/191,328.
Office Action dated Jul. 30, 2013 for U.S. Appl. No. 13/102,974.
U.S. Appl. No. 13/191,328 Office Action dated Oct. 4, 2013.

* cited by examiner

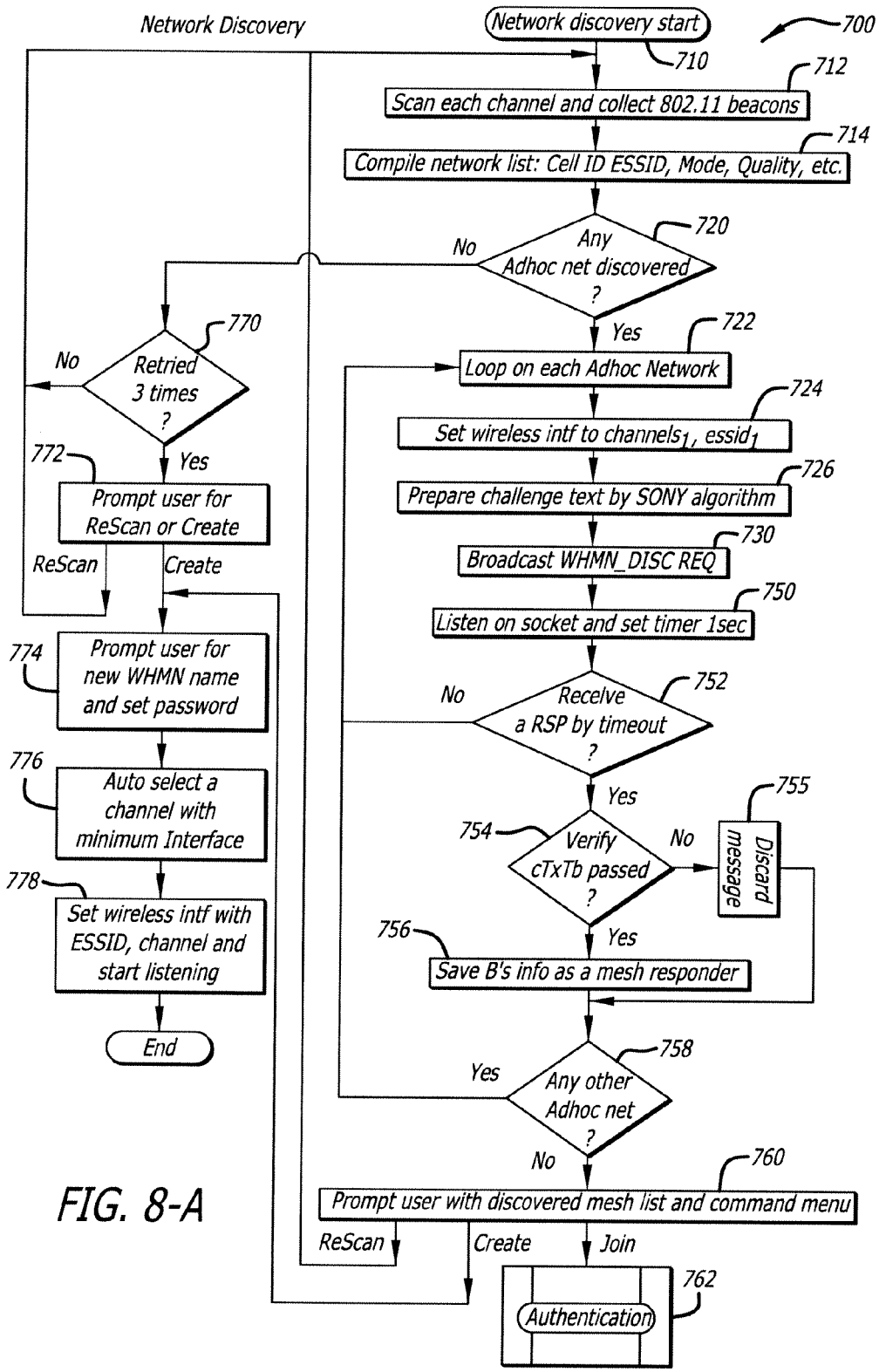
FIG. 8-A

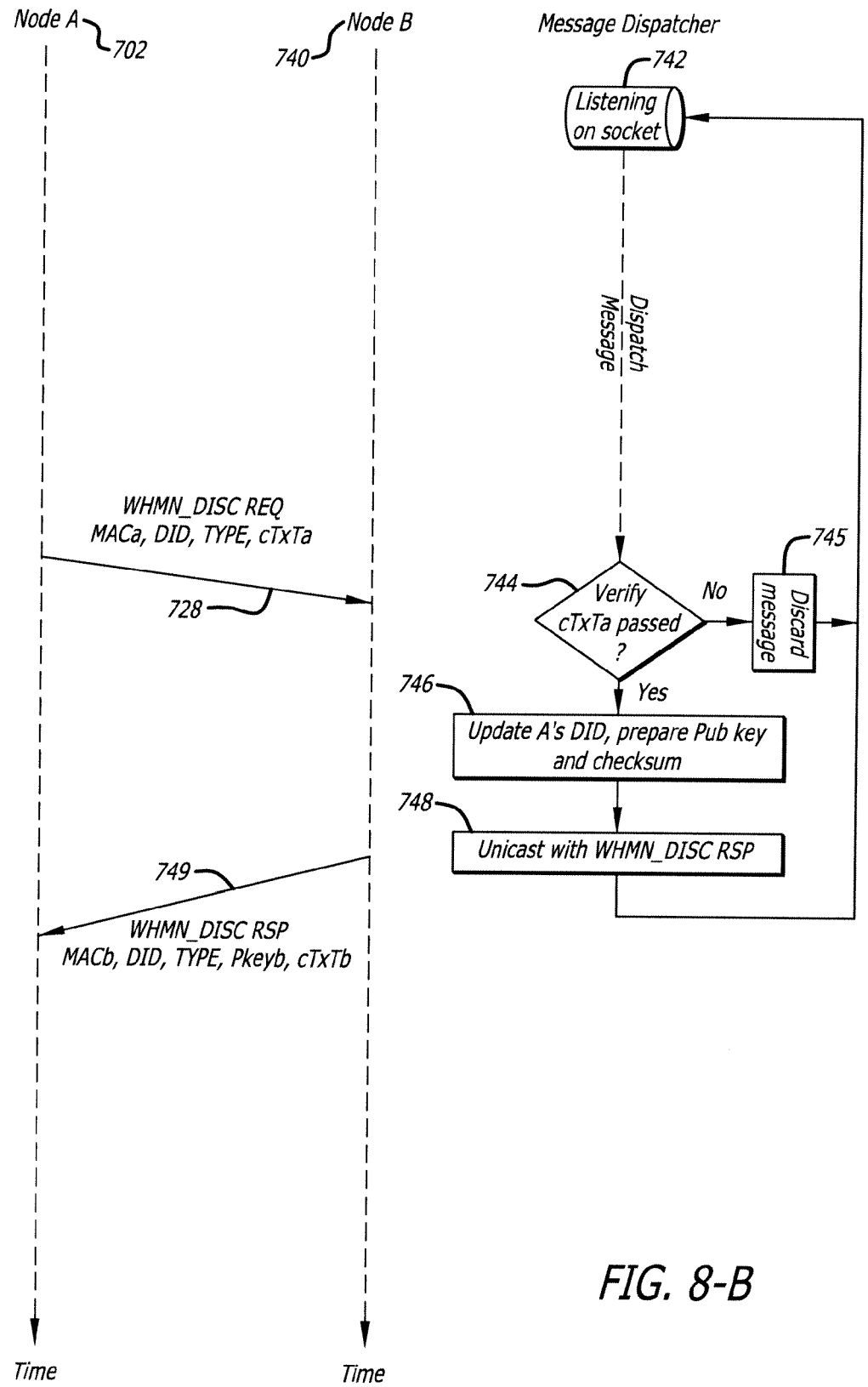
FIG. 8-B

MULTI-TIER WIRELESS HOME MESH NETWORK WITH A SECURE NETWORK DISCOVERY PROTOCOL

CROSS-REFERENCE TO RELATED APPLICATION

The application is a continuation of U.S. patent application Ser. No. 12/360,821, filed Jan. 27, 2009 now U.S. Pat. No. 7,961,674 and incorporated herein by reference.

FIELD

The invention relates generally to the field of wireless device connectivity. More particularly, one or more of the embodiments of the invention relate to a method and apparatus for a multi-tier wireless home mesh network using a secure network discovery protocol.

BACKGROUND

A wireless network can provide a flexible data communication system that can either replace or extend a wired network. Using radio frequency (RF) technology, wireless networks transmit and receive data over the air through walls, ceilings and even cement structures without wired cabling. For example, a wireless local area network (WLAN) provides all the features and benefits of traditional LAN technology, such as Ethernet and Token Ring, but without the limitations of being tethered together by a cable. This provides greater freedom and increased flexibility.

Currently, a wireless network operating in accordance with the Institute of Electrical and Electronic Engineers (IEEE) 802.11 Standard (e.g., IEEE Std. 802.11a/b/g/n) may be configured in one of two operating modes: infrastructure mode and ad hoc mode. As of today, most installed wireless networks are configured and operate in infrastructure mode where one or more access points (APs) are configured as interfaces for a wired distribution network (e.g., Ethernet). In infrastructure mode, mobile devices with wireless connectivity (e.g., laptop computer with a radio network interface card "NIC") are able to establish communications and associate with the AP, and thus, the users of these devices are able to access content within servers connected to the wired network.

As an optional feature, however, the IEEE 802.11 Standard specifies ad hoc mode, which allows the radio NIC within each wireless device to operate in an independent basic service set (IBSS) network configuration. Hence, the wireless devices perform peer-to-peer communications with each other instead of utilizing the AP for supporting such wireless communications. The ad hoc mode also allows users to spontaneously form a wireless LAN. For example, a group of employees with laptops implemented with IEEE 802.11 wireless chipsets may gather at a coffee house and form a small WLAN by switching their NICs to ad hoc mode. As a result, the employees could share presentation charts and spreadsheets without the need for cabling or an AP.

One type of ad hoc network is referred to as a mesh network, which allows for continuous connections and reconfiguration around broken or blocked paths by "hopping" from device to another device until the destination is reached. Mesh networks differ from other networks in that the devices can all connect to each other via multiple hops without an infrastructure (e.g., an AP), and these devices generally can be mobile or stationary. Related to mesh networks, mobile ad-hoc networks (MANETs) are self-configuring networks of mobile routers, where the routers are free to relocate.

One of the primary advantages of mesh networks (and MANETs) is their ability to extend the range of the wireless network. For example, a user on one side of the building can send a packet destined to another user on the far side of the facility, well beyond the point-to-point range of IEEE 802.11-compliant AP, by having the radio signal hop from one mobile device to mobile device until the radio signal gets to its targeted destination. This can extend the range of the WLAN from hundreds of feet to miles, depending on the concentration of wireless users. A mesh network can also balance the network traffic load into different routes using orthogonal wireless channels (frequencies) without interfering with each other. In traditional networks connecting to APs, all traffic is routed through the access point, which can be easily saturated. In addition, all wireless links have to use the same frequency as the APs, which causes severe interference and results in low efficiency.

With recent technology advances in integrated circuits, and breakthroughs in multiple input and multiple output (MIMO) systems, wireless digital communications have entered a new era that allows faster speed for wireless networking applications. Mobile devices such as smart phones, music/movie players, personal digital assistants, gaming devices and the like, are creating a demand for new wireless communication and networking technologies to allow seamless connection of wireless mobile devices within a home network that not only support high-bandwidth demanding applications such as high-definition (HD) videos, but also relies on manufacturer compatibility between the wireless devices to mitigate interloper and rogue network activity.

SUMMARY

One disclosed feature of the embodiments provides a method and apparatus for a multi-tier wireless home mesh network using a suite of protocols including a secure network discovery protocol. The method includes formation of a wireless home networking environment that seamlessly interconnects various proprietary devices to provide a wireless plug and play experience. A multi-tier wireless home mesh network is described that improves existing home network performance for better range/rate and interconnection with outdoor wireless networks. Home electronic devices may be classified according to a multi-tier system, comprising a collection of nodes that operate as a decentralized, wireless ad hoc network with multiple ($N \geq 1$) sub-networks (hereinafter referred to as "tiers") that are responsible for different functions within the network. Each node of the multi-tier wireless network can be configured to a particular tier based on the node's performance capabilities, and is capable of forwarding data to other nodes.

In one embodiment, a hierarchical architecture is described where different functions can be implemented for stationary and mobile nodes in the network. In one embodiment, using the various available home electronic devices, these devices may be organized as nodes of a wireless home network. For example, a first tier of the network may resemble a traditional Internet connection (via a cable/DSL connection, 3G/WiMax, or outdoor mesh). The node directly connected to the Internet may be referred to as a gateway node and there may be multiple gateway nodes in a home network. A second tier of the network represents the backhaul of the network that interconnects various fixed-location electronics devices (e.g., flat-panel TVs, Playstations, or desktop computers) that are usually stationary and electrically coupled to a power supply (non-power constrained). A third tier of the network may include links between a device belonging to the second tier of the network and low-powered, resource-constrained mobile platform devices (e.g., laptops, cellular phones, PDAs, etc.).

In a further embodiment, the secure network discovery protocol may include the identification of surrounding wireless ad hoc networks. Once identified, one or more proprietary messages may be exchanged to detect the presence of a wireless home mesh network. Further, the messages help identify an electronics device as either a mobile node or a stationary node of the wireless home mesh network. Once a new electronics device is established as a node of the wireless home mesh network, the new electronics device is connected to an existing mesh node. Using the connection, the new electronics device may wirelessly communicate with other electronics devices that are nodes of the wireless home mesh network.

In one embodiment, when the secure network discovery protocol does not detect the presence of a wireless home mesh network, the wireless device may enter a network initiator mode. Likewise, the wireless device may enter the network initiator mode even when a wireless home mesh network is detected, if the wireless device desires to generate a new wireless home mesh network. According to such an embodiment, a user may be prompted to establish a name for the new wireless home mesh network, and a password for the network. The user may also select a channel for the network. A channel having minimal interference is generally selected and can be automatically generated using a channel selection algorithm. Once the channel is selected, a wireless interface for the network may be set with an extended service set identifier (ESSID). According to this embodiment, the new wireless network is then set to the selected channel so that a new node may begin listening for discovery requests.

BRIEF DESCRIPTION OF THE DRAWINGS

The present invention is illustrated by way of example, and not by way of limitation, in the figures of the accompanying drawings and in which:

FIGS. 8A and 8B are flow charts illustrating a method for formation of a multi-tier WHMN, according to one embodiment.

DETAILED DESCRIPTION

In the following description, for purposes of explanation, numerous specific details are set forth in order to provide a thorough understanding of the present invention. It will be apparent, however, to one skilled in the art that the present invention may be practiced without some of these specific details. In addition, the following description provides examples, and the accompanying drawings show various examples for the purposes of illustration. However, these examples should not be construed in a limiting sense as they are merely intended to provide examples of embodiments of the invention rather than to provide an exhaustive list of all possible implementations. In other instances, well-known structures and devices are shown in block diagram form in order to avoid obscuring the details of the disclosed features of various described embodiments.

System Architecture

In the following description, certain terminology is used to describe certain features of the invention. For instance, the term "wireless node" is generally defined as a device with data processing and wireless communication capabilities. The term "logic" is generally defined as hardware and/or software configured to perform one or more functions. One example of a certain type of logic is a wireless chipset, being one or more integrated circuits, operating to request access to a wireless network and/or authenticate a wireless node before granting the node access to the wireless network. "Software" is generally describes as a series of executable instructions in the form of an application, an applet, or even a routine. The software may be stored in any type of machine readable medium such as a programmable electronic circuit, a semiconductor memory device such as volatile memory (e.g., random access memory, etc.) and/or non-volatile memory such as any type of read-only memory (ROM) or flash memory, a portable storage medium (e.g., USB drive, optical disc, digital tape), or the like.

The term "message" represents information configured for transmission over a network. One type of message is a frame that is generally defined as a group of bits of information collectively operating as a single data unit. The term "content" includes video, audio, images, data files, or any combination thereof.

Figure 1:
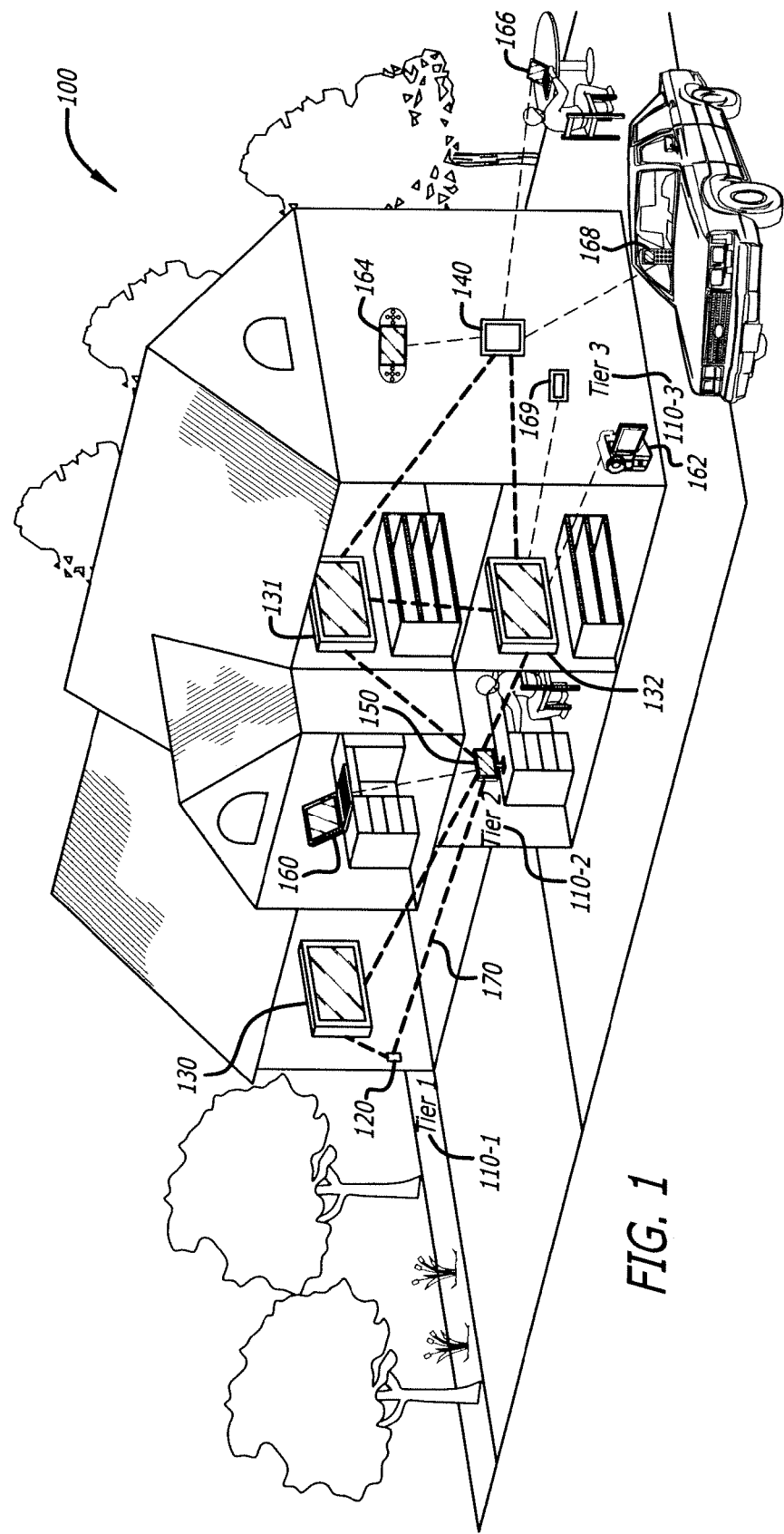
FIG. 1 is a block diagram illustrating a three-tier wireless home mesh network, according to one embodiment.

Referring to FIG. 1, an exemplary embodiment of a multi-tier wireless home mesh network 100 is described. Multi-tier wireless home mesh network 100 (hereinafter referred to as "home network 100") comprises a collection of nodes that operate as a decentralized, ad hoc wireless network with multiple (N≥1) sub-networks $110_1$-$110_N$ (hereinafter singularly referred to as "tiers") that are responsible for different functions within home network 100. Hence, mostly every node of home network 100 is configured to forward data to other nodes and is assigned to a different tier based on its performance capabilities and power constraints. The assignment of a node to a tier is a decision based on performance capabilities of the node, whereas routing decisions are made by the nodes based on the network connectivity and the ability to forward data by that particular node.

For instance, one embodiment of, home network 100 features a hierarchical architecture comprising three (3) tiers that are assigned based on the capabilities of the node. A first tier ("tier 1") $110_1$ is responsible for establishing and controlling access to an external network such as the Internet, and may resemble a traditional Internet connection via a cable or direct subscriber line (DSL) connection or 3 G/WiMax/Outdoor mesh. As illustrated, first tier $110_1$ comprises a first node 120, which is commonly referred to as a "gateway node." Gateway node 120 may include, but is not limited or restricted to a cable or DSL modem, a wireless router or bridge, and the like. Although not shown, multiple gateway nodes may be present within home network 100 in order to provide multiple communication paths to external network(s).

A second tier ("tier 2") $110_2$ of home network 100 may represent a wireless network backhaul that interconnects various stationary (fixed-location) wireless nodes, such as stationary (fixed-location) home electronics devices adapted for communicating over a wireless communication medium such as, for example, radio frequency (RF) waves. As described herein, an "electronics device" may be stationary or mobile. A "stationary electronics device" includes, but is not limited or restricted to: a flat-panel television (130, 131, and 132), a gaming console (140), desktop computer (150), or any other device that is usually stationary (fixed-location) and is electrically coupled to an AC power outlet. Hence, stationary wireless nodes are not subject to power constraints that are usually present in mobile wireless nodes where power usage is minimized to extend battery life between recharges.

Referring still to FIG. 1, a third tier ("tier 3") $110_3$ of home network 100 may include links between a wireless node belonging to second tier $110_2$ and one or more mobile wireless nodes (160-169). A "mobile electronics device" or "mobile wireless node" may include any battery powered electronics device with wireless connectivity including, but not limited to, a laptop computer, handheld device (e.g., personal digital assistant, ultra mobile device, cellular phone, portable media player, wireless camera, remote control, etc.) or other like non-stationary electronics devices. Since mobile wireless nodes normally have resource constraints (e.g., limited power supplies, limited processing speeds, limited memory, etc.), third tier $110_3$ may provide reduced services. In one embodiment, mobile wireless nodes of home network 100 may act as a slave or child connecting directly to a tier 2 node, which may further limit their functionality within home network 100.

Below, Table 1 summarizes a multi-tier, wireless home mesh network architecture, categorization by potential network characteristics, tier node descriptions, and traffic type that is prevalent over home network 100.

As indicated by Table 1, home network 100 is distinct from conventional ad hoc mesh-network solutions because home network 100 is directed to consumer electronics devices and video-centric applications. Based on the traffic indicated in Table 1, which may include high-definition (HD) video, audio clips and video clips, as well as user data, wireless NICs may be incorporated within some of the stationary nodes of home network 100. For example, by multiplexing one flow of compressed HD video, four Internet video sessions, plus four audio/video sessions, and some intermittent http data traffic, the load on the backhaul link 170 is approximately 60 megabits per second for TCP/UDP type traffic, which may require at least 100 megabits per second of raw radio support considering media access control (MAC) layer efficiency. According to this example, the tier 2 nodes might require an 802.11n type radio (e.g., at 5 GHz band) to meet such a bandwidth requirement.

Figure 2:
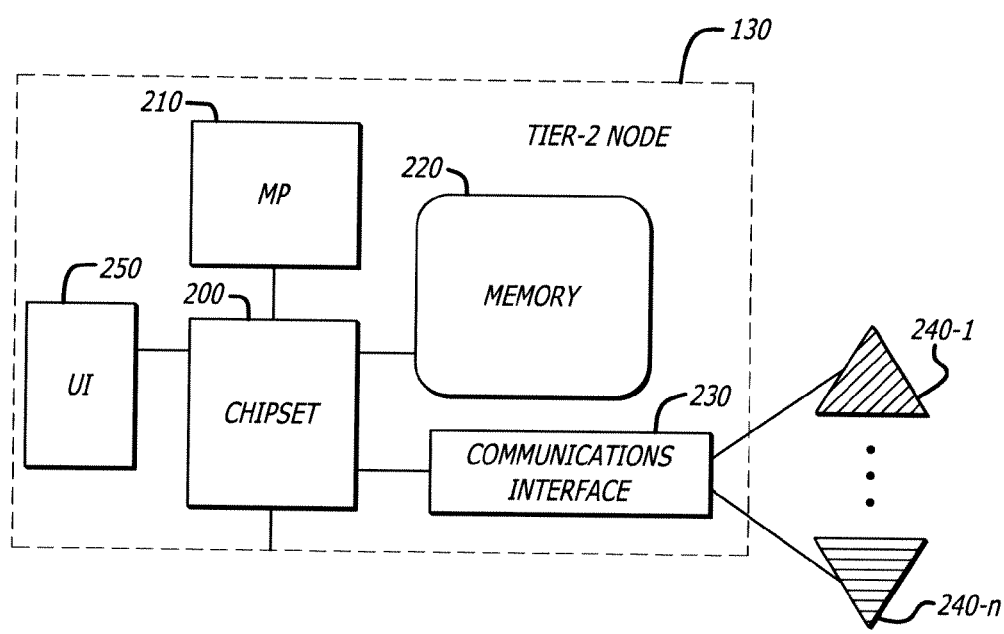
FIG. 2 is a block diagram illustrating a tier-2 node within a wireless home mesh network, according to one embodiment.

Referring now to FIG. 2, an exemplary embodiment of tier 2 node 130 is shown. Herein, tier 2 node 130 comprises an embedded wireless network chipset 200 that includes one or more processors 210, memory 220, a communications interface 230, and a user interface (UI) 250. According to this embodiment, processor(s) 210 are adapted to initiate and process request messages to join home network 100 of FIG. 1, as well as to authenticate a node requesting to join home network 100 even if it is already a part of home network 100. These messages are transmitted and received over communications interface 230, which may include one or more antennas $240_1$-$240_N$ (N≥1 (that are controlled by processor 210 or dedicated circuitry (not shown) to tune and receive incoming

TABLE 1 multi-tier wireless home mesh network scenario

| | | Characteristics | Examples |
|---|---|---|---|
| Network | Dimension | ~50 × 60 sq ft; 1-2 stories or high-rising building | House Apartment building Business |
| | Node Number | Tier 2 - 3~10; Tier 3 - 5~20 | 2 TVs, 1 desktop computer, 1 PS3; 2 laptops, 4 mobile phones, 4 media players, . . . |
| | Distribution | Indoor, 3D, Non-LOS, link distance 15~60 ft | Uniformly distributed Tier-2 nodes, clustered Tier 3 |
| Node Type (per Tier Network) | Tier 1 | Usually one or two Tier 1 nodes | Cable/DSL modem, WiMax/3G, Outdoor Mesh |
| | Tier 2 | Fixed location, power-sufficient (TX power 100 mW-1 W) | TV, desktop computer, gaming console (e.g. PS3), etc. |
| | Tier 3 | Mobile, power-limited (TX power 1-100 mW) | Laptop, mobile phone, portable media player, wireless camera, remote |
| Network Traffic | HD video streaming | ~30 Mbps compressed | 1080p/i, 720p/i, 480p/i quality HD videos |
| | SD Video/Audio streaming | ~100k-1 Mbps video, 32k-256 kbps audio | Internet video clip (e.g. YouTube), webcam output, mp3 audio, voice |
| | Data | Bursty transmission, ~20 Mbps for certain user satisfaction | http type data (web browsing) | wireless signals on a particular channel and to transmit outgoing wireless signals to other nodes over that particular channel.

Referring back to FIG. 1, prior to communicating data, tier 2 node 130 associates with another node that is already part of home network 100. After an association is established, tier 2 node 130 and another tier 2 node 150 can exchange data. The association process is a two step process involving three states: (1) unauthenticated and unassociated; (2) authenticated and unassociated; and (3) authenticated and associated. To transition between the states, the communicating parties exchange messages called management frames. In operation, all nodes are adapted to transmit one or more management frames, referred to as Neighbor Discovery Request messages, to determine if there are any nodes that can decode the message and respond in a timely manner.

Before conducting operations to associate (join) home network 100, tier 2 node 130 listens for response messages to a Neighbor Discovery message (see FIGS. 5 and 6) in order to identify what other nodes are within range and in communication over what channel. After identifying node 132, these nodes 130 and 132 may perform a mutual authentication by exchanging several management frames as part of the process. After successful authentication, tier 2 node 130 moves into the second state authenticated and unassociated. The authentication and discovery techniques are described in more detail in FIG. 7.

Figure 3:
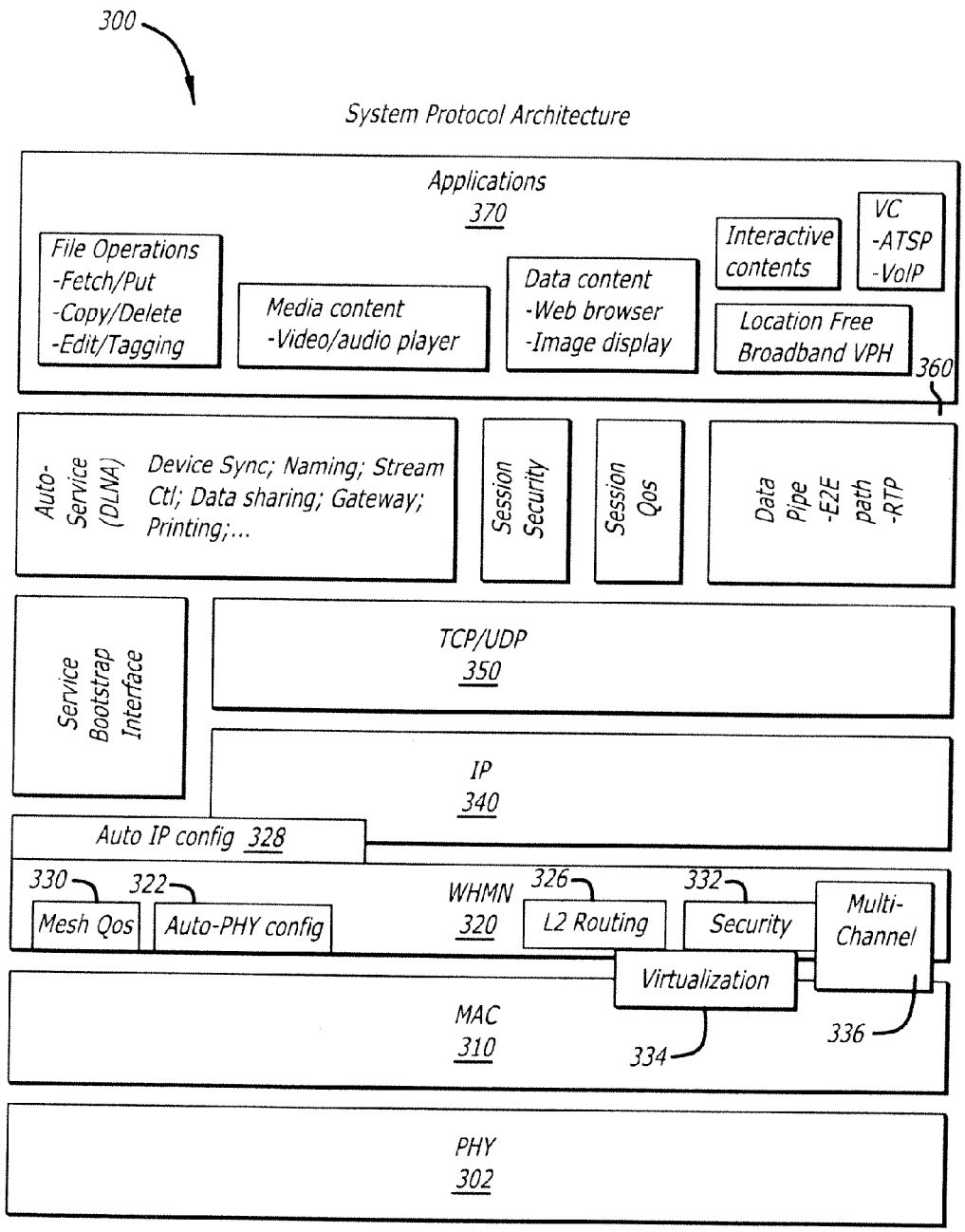
FIG. 3 is a block diagram illustrating wireless home mesh network protocol architecture, according to one embodiment.

Referring now to FIG. 3, a block diagram of an exemplary embodiment of an Open Systems Interconnection (OSI) layer representation of the system protocol architecture 300 for a node within home network 100 is shown. This protocol architecture 300 is provided to achieve a self-organizing, self-configuring home network where different functions or features are designed or enhanced to current wireless network architectures built upon TCP/IP/802.11.

To enable wireless mesh network functions, a single WiFi radio platform may be used. For example, for tier 2 nodes, one IEEE 802.11a/b/g/n, dual-band card (mini PCI, PCI express, USB dongle, or the like) is used for backhaul links to operate at a 5 GHz band or higher bandwidth. In one embodiment of the invention, links connecting tier 3 nodes are compatible with legacy 802.11b/g mode simply because, at this time, most current mobile nodes support IEEE 802.11b/g WiFi. Of course, the particular wireless PHY 302 and MAC layers 310 may be altered accordingly.

As shown in FIG. 3, in the protocol architecture 300 described, wireless home mesh network ("WHMN") functions 320 are placed between MAC layer 310 and network IP layer 340 to provide a solution that is independent of the higher OSI layers deployed (e.g., Applications layer 370, Session layer 360, and TCP/UDP layer 350) and can be more easily reconfigured. Representatively, in the system protocol architecture 300 of FIG. 3, enhanced functionality is placed in WHMN layer 320 between MAC layer 310 and a Network (IP) layer 340. Hence, WHMN layer 320 generally constitutes an "OSI layer 2.5" solution. The placement of WHMN layer 320 provide enhanced functionality that is transparent to both lower and higher OSI layers, and different radio chipsets can be supported. WHMN layer 320 carries key functions for network configuration, including device discovery and authentication as described below.

In one embodiment, WHMN functions layer 320 is transparent to both lower and higher layers, while providing support for different radio chipsets. The WHMN layer 320 can perform functions of WHMN organization and configuration such as auto-PHY (network discovery) configuration 322, layer 2 routings 326, auto-IP configuration 328, etc. In one embodiment, each node uses MAC packets with its MAC address for initial topology setup.

As shown in FIG. 3, WHMN layer 320 includes various smart network functions (322-336), according to one embodiment. These smart network functions are placed between, and may overlap with, a MAC layer and IP layers 310 and 340. In one embodiment, the auto-PHY configuration function 322 may provide automated network discovery functionality when an electronics device is activated. In one embodiment, electronics devices, as referred to herein, describe electronic devices that include a radio NIC from an original equipment manufacturer (OEM). Some sample OEM electronic devices may include Sony® BRAVIA® flat-panel televisions, Sony® Playstation 3® game consoles, Sony® VAIO® computers, or other like Sony® stationary and handheld devices, such as smart devices.

Figure 4:
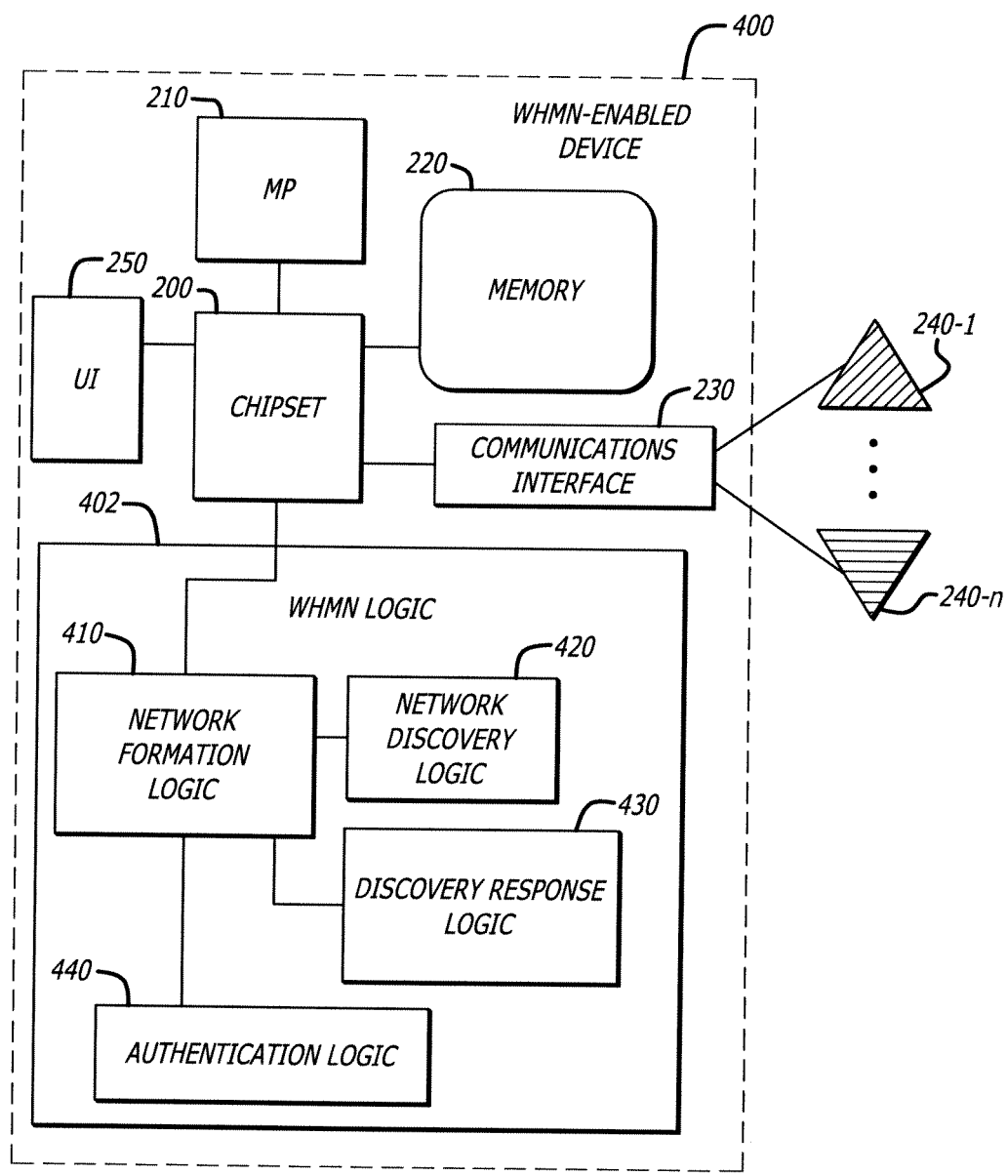
FIG. 4 is a block diagram illustrating a wireless home electronics device configured to implement a wireless home mesh network (WHMN), according to one embodiment.

In one embodiment, auto-PHY configuration 322 may provide features for initial wireless home mesh network setup, that are incorporated into an OEM electronics device such as electronics device 400, as shown in FIG. 4.

As illustrated in FIG. 4, a wireless node that is WHMN-enabled, such as an OEM electronics device 400, includes a microprocessor 210 that uses wireless chipset 200 to access memory 220 and communications interface 230. The communications interface may include one or more (N>1) tunable antennas $240_1$, $240_N$. In contrast to conventional electronics devices, device 400 includes wireless home mesh network ("WHMN") logic 402. The WHMN logic 402 includes network formation logic 410. The logic 410 uses network discovery logic 420.

In one embodiment, when wireless node 400 is powered on, network discovery logic 420 may scan each channel to detect the presence of other wireless ad hoc networks. According to the IEEE 802.11 standard, when a wireless card operates in an ad hoc mode, various devices send out beacons in a predefined manner according to the ad hoc mode. In one embodiment, when a WHMN is established, including at least one stationary node, the stationary node will periodically transmit a beacon to maintain standard ad hoc operations.

Figure 7:
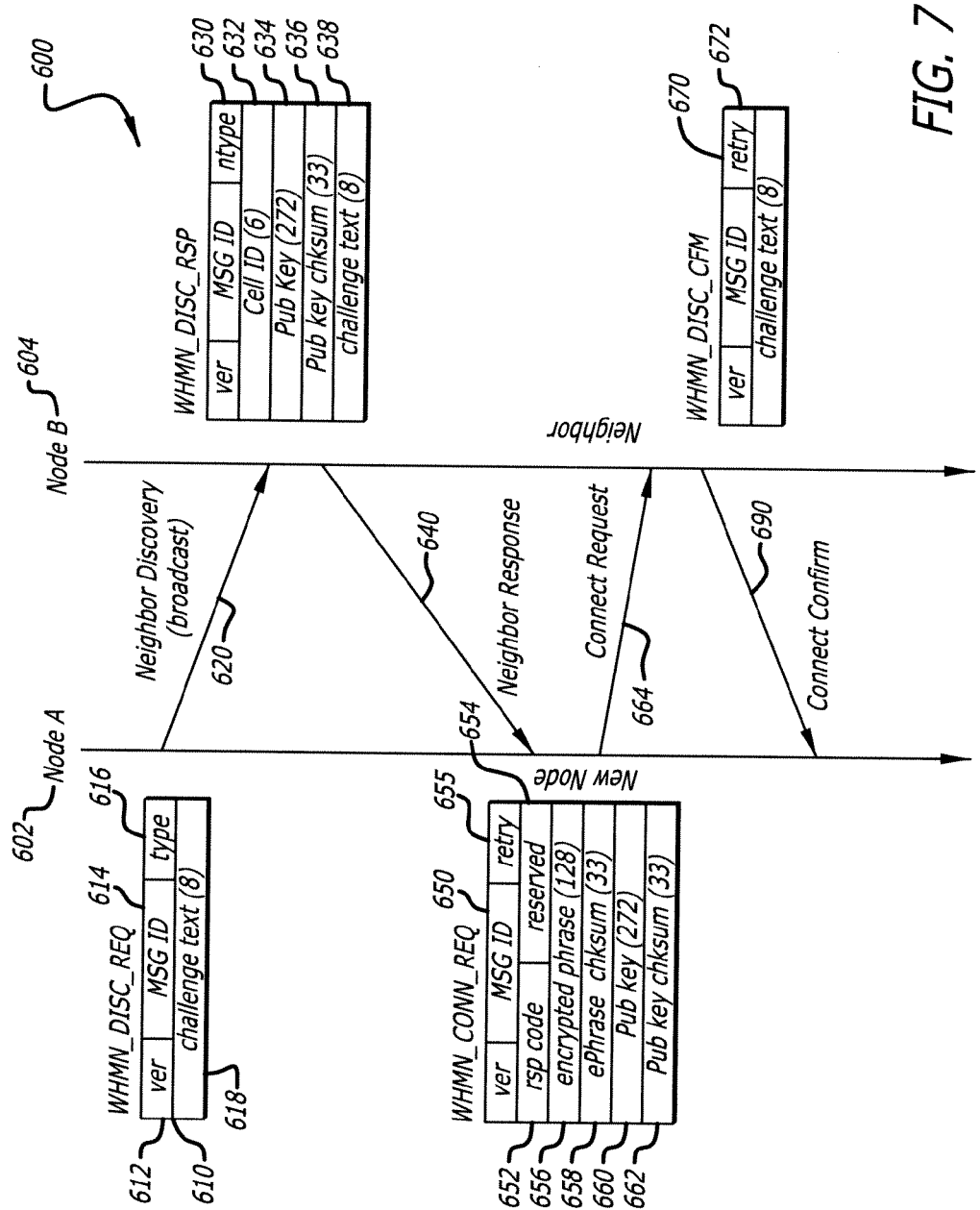
FIG. 7 illustrates a message flow diagram, performed by an electronics device to discover, authenticate, and join a WHMN, according to one embodiment.

Activation of wireless node 400 may trigger the network discovery logic 420 to issue 802.11 functions to scan each wireless channel to determine a list of available wireless networks. Based on the detected beacons, network discovery logic 420 may identify one or more wireless networks that are operating in an ad hoc mode. The network discovery logic 420 may transmit one or more security parameters to detect a WHMN from one or more identified wireless ad hoc networks. These security parameters may enable an existing node within a wireless home mesh network (WHMN) to verify wireless node 400 as an electronics device from a same OEM. Discovery response logic 430 may respond to a network discovery request when device 400 is a node of a WHMN. An authentication process, as shown in FIG. 7, may be performed by authentication logic 440.

Referring again to FIG. 4, in one embodiment, if wireless node 400 does not detect the presence of a WHMN, network formation logic 410 may enter a network initiator phase to establish node 400 as either a mobile node or a stationary node of a WHMN. For example, referring again to FIG. 1, flat-panel television (TV) 130 may initially become a first stationary node for WHMN 100 of FIG. 1. According to such an embodiment, TV 130 will include a radio NIC which will periodically emit a beacon to enable identification of WHMN 100 by any newly-added electronics devices. For example, desktop computer 150, upon activation, may detect the presence of WHMN 100 based on a response received from TV 130 in response to a connection request message, which is organized based on a proprietary format as shown in FIG. 5.

Figure 5:
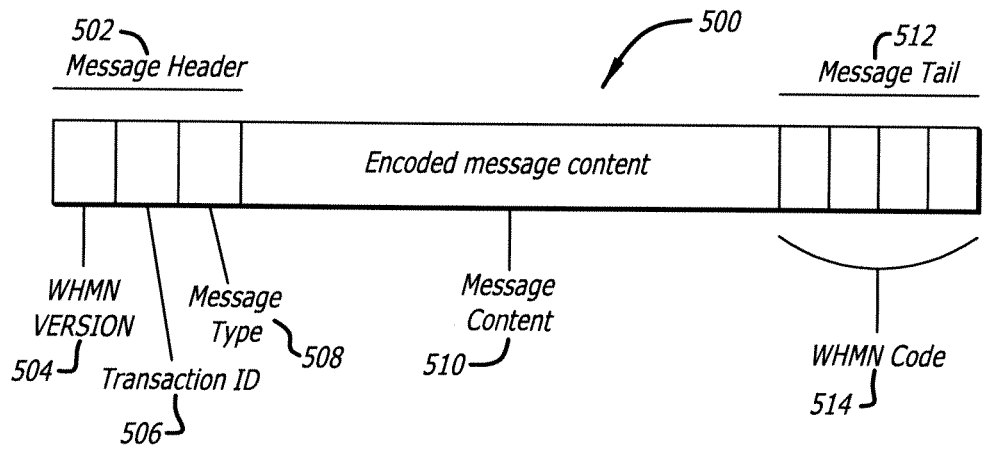
FIG. 5 illustrates a generic WHMN message packet format according to one embodiment.

FIG. 5 illustrates an exemplary format of a WHMN message 500 which is representative of a messaging format that node 400 of FIG. 4 uses for initial WHMN setup. For example, during a discovery phase where nodes analyze their wireless environment, each new wireless node may run a network scan (using standard 802.11 functions) to find all wireless networks in its neighborhood. The new node then transmits a Discovery message as a broadcast or multicast to all identified wireless ad hoc networks in an attempt to identify a WHMN in its neighborhood. Existing nodes of a WHMN respond to the Discovery message with appropriate details necessary to establish a new connection.

More specifically, as shown in FIG. 5 as an illustrative embodiment, WHMN message 500 may include (i) a message header 502, (ii) message content 510, and (iii) a message tail 512. Herein, according to this exemplary embodiment, message header 502 includes a WHMN version 504, a transaction (message) ID 506 that identifies the particular message, a type parameter 508 indicates a type of node transmitting the message (e.g., tier 1, tier 2 or tier 3). Message content 510 may include encoded data that is used to protect the data from interlopers and to ensure that the data is accessible only by the targeted wireless node. Message tail 512 includes a WHMN code 514. In one embodiment of the invention, each WHMN message ends with a repeated WHMN code 514 that may be repeated a predetermined number of times to ensure that an entire message is received without error.

Figure 6:
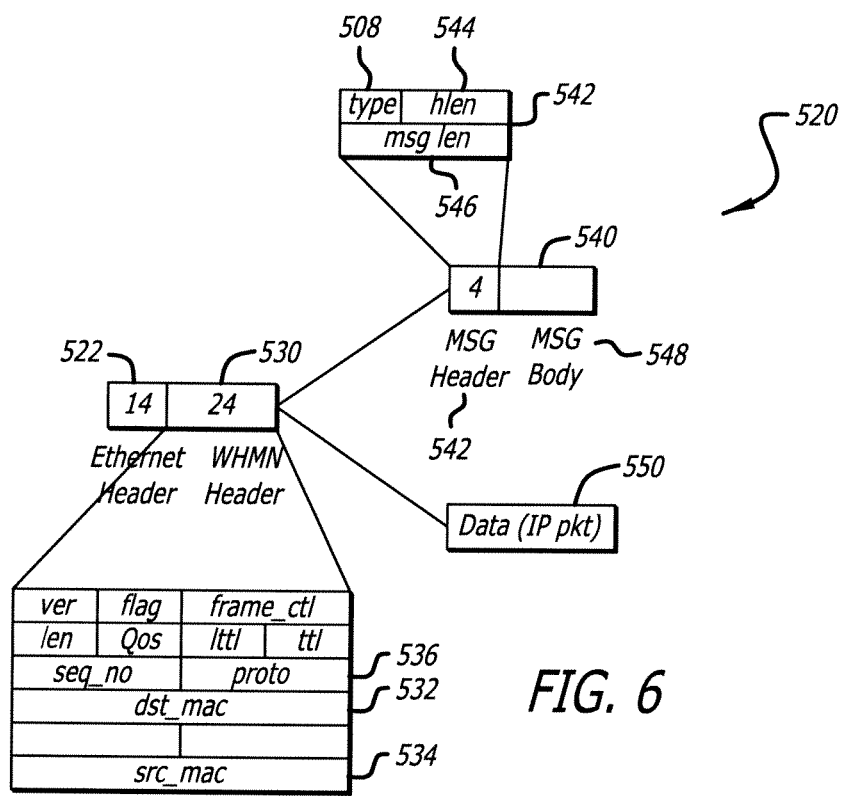
FIG. 6 illustrates the implementation of a generic WHMN message packet format according to one embodiment.

As an example, FIG. 6 illustrates exemplary formats of two types of WHMN message 500, namely WHMN data message 550 and WHMN control message 540. Herein, according to this embodiment, both WHMN data message 550 and WHMN control message 540 are routed by encapsulating these messages within an Ethernet packet 520. For example, as shown in FIG. 6, Ethernet packet 520 includes a 24-byte WHMN header 530 that is inserted after an Ethernet header 522. WHMN header 530 includes a destination MAC address 532 to identify a destination for WHMN message 500 and a source MAC address 534 to identify a source of WHMN message 500. Other information 536 also may be placed within header 530 including, but not limited to, a protocol version that identifies a version of the system protocol architecture, a control flag, a frame type as being data or control, a frame length, a QoS feature, a Time-to-Live (TTL) value that specifies how long (in hops) the message is allowed to "live" on the network where each hop causes the TTL value to be reduced by one, a sequence number that indicates the sequence of the frame within a complete message transaction, and a data protocol type.

For control messages (e.g. discovery, authentication, routing), 4-byte control header 542 is inserted after header 530, where control header 542 includes type 508, header length 544, and message length 546. After control header 542, a message body (content) 548 of WHMN control message 540 is inserted. For Discovery messages, for instance, content 548 is a "challenge text" as described below.

For WHMN data messages 550, however, an IP data packet received from the OSI network layer is attached to Ethernet packet 520 after WHMN header 530 in lieu of control header 452 and content 548 to form a WHMN data message 550.

FIG. 7 illustrates one embodiment of a message flow diagram 600, performed by an electronics device that desires to join a WHMN and a responding (existing) node of a WHMN. As shown in FIG. 7, the new electronics device is referred to as Node A 602 and the responding node is referred to as Node B 604, respectively. FIG. 7 illustrates a broadcast message (WHMN discovery request) 610 that electronics device 602 sends to one or more detected wireless ad hoc networks. The network discovery message 610 is sent out in an attempt to find an existing WHMN from the detected wireless ad hoc networks. The message 610 is proprietary to the WHMN and will be recognized by other WHMN-enabled OEM devices in the neighborhood. In one embodiment, the message may include a 64-bit security field 618 to protect the WHMN from denial-of-service (DOS) attack from non-OEM/non-WHMN-enabled devices.

In one embodiment, challenge text 618 may include a secret key combined with an extended service set identification (ESSID) of a network that a new electronics device 602 is attempting to join. When Node B 604 receives the neighbor discovery broadcast message (see arrow 620), Node B 604 may verify that the challenge text 618 matches an expected value. Presuming challenge text 618 is verified to identify Node A 602 as a WHMN-enabled OEM device, Node B 604 will generate a WHMN discovery response 630 as shown in FIG. 7. As shown in FIG. 7, message 630 may include an 802.11 cell ID 632, a public key 634, a public key checksum 636, as well as challenge text 638. The public key is used in the connection phase. The checksum for the public key helps ensure that the received message was not tampered with or changed in a man-in-the-middle attack.

In one embodiment, receipt of the neighbor response (see arrow 640) indicates to Node A 602 that a detected ad hoc network is identified as a WHMN. Based on the identification of a WHMN, Node A 602 may save various information regarding Node B 604. Node A 602 may repeat this process to identify multiple WHMNs, which may be presented to the user as a list, with a user selection required to join a desired network. Based on a user password for a selected WHMN, Node A 602 generates a connection request message 650 which validates the encrypted phrase 656 and Node B 604 generates a connection confirmation message 670 (see arrow 664) if the connection request is validated (see arrow 690). The authentication process for generating the connection request message 650 and connection confirmation message 670 is further described in U.S. patent application Ser. No. 12/360,771, filed on Jan. 27, 2009. Procedural methods for implementing one or more embodiments are now described.

Operation

FIGS. 8A and 8B are flow charts illustrating a method 700 for formation of a multi-tier wireless home mesh network with a secure network discovery protocol, according to one embodiment of the invention. The discovery may be performed within a wireless home mesh network (WHMN), for example, as depicted in FIG. 1, utilizing an OEM/WHMN-enabled electronics device as described in FIG. 4, in accordance with one embodiment.

As shown in FIG. 8A, the secure network discovery protocol begins with a network discovery start 710. As shown in FIG. 8A, new electronics device (Node A) 702 performs a WHMN discovery according to one embodiment. At process block 712, each channel is scanned by Node A 702 to collect 802.11 beacons. Based on such beacons, at process block 714, a network list is compiled including a cell ID, an ESSID, mode, quality, and the like. Based on such information, Node A 702 determines at process block 720 whether an ad hoc network is discovered. When an ad hoc network is not discovered, in one embodiment, as shown in process block 770, the process may be retried until a user is prompted either to create a WHMN, or perform a rescan. This process for performing network initiation is shown at process blocks 724-758.

Representatively, when an ad hoc network is not discovered at process block 720, at process block 770, Node A 702 may perform a predetermined number of retries such as, for example, three retries. Following the predetermined number of retries, at process block 772, Node A 702 may prompt the user to rescan for available wireless networks by returning to process block 712. However, if the user desires to enter network initiation mode, to create a new network, the flow continues to process block 774. At process block 774, a user is prompted for a new name for the new WHMN as well as setting a password for the network. At process block 776, a channel with, for example, minimal interference is selected. Once selected at process block 778, a wireless interface of the network may be set with an extended service set identifier (ESSID) and a channel is set for the wireless network according to the selected channel so that the new node 702 may begin listening for discovery requests.

Referring again to process block 722, for each detected ad hoc network, Node A 702 performs process blocks 724-756. At process block 724, Node A 702 sets its information to the parameters of a detected ad hoc network. At process block 726, the node prepares challenge text as described above. At process block 730, the node broadcasts a WHMN discovery request to the detected mesh network. Following the broadcast, at process block 750, Node A 702 listens on a socket for a predetermined period of time. At process block 752, it is determined whether a timeout is detected. When a timeout is detected, network initiation is performed as shown at process blocks 724-758.

Representatively, if a response is received prior to the timeout, response verification is performed at process block 754. Based on the response verification, at process block 756, the identified node and information of the identified node is saved. At process block 760, for each WHMN identified from one or more detected wireless ad hoc networks, the device may present a list of such networks to a user, and prompt a user either to join a selected WHMN (see process block 762), create a new WHMN, or perform a rescan. If the user desires to join a network, the device performs an authentication process at process block 762 to establish itself as either a stationary node or a mobile node of a WHMN.

As further illustrated in FIG. 8B, at process block 742, an existing WHMN Node 740 may listen on a socket for a received WHMN discovery request. Based on a received WHMN discovery request (see arrow 728), at process block 744, Node 740 verifies that the challenge text of Node 740 is verified. Once verified, Node 740 may update a record for the detected node's device ID, the public key, and checksum at process block 746. Otherwise, the message is discarded at process block 745. Once generated, Node 740 unicasts a discovery response message, as shown at process block 748 (see arrow 749) to return to process block 752 of FIG. 8A, where Node A 702 awaits a discovery response to identify a WHMN.

As described above, a neighbor discovery message is a broadcast message that a node sends out in an attempt to find and join a WHMN. The message is proprietary and is recognized by other WHMN-enabled OEM devices in the neighborhood. As indicated above, in one embodiment, the WHMN features are limited to devices from a predetermined OEM. However, a non-OEM device may be modified to include WHMN functions, as shown in FIG. 3.

Referring again to FIGS. 5-7, a node type 616 lets the neighbors know about the requesting node's capabilities, which may be the gateway shown in FIG. 1, the stationary node type includes tier 2 stationary devices including desktop computers, digital televisions, game consoles, set-top boxes, and the like. FIG. 7 illustrates a sample neighbor response message 630.

Representatively, FIG. 7 illustrates that message 630 contains the WHMN ID 614, a WHMN security key, and other parameters required by a requesting node to join a WHMN. Similarly, the node type 616 lets the requesting node know the capabilities (gateway, stationary, or mobile) of a replying neighbor node. The neighbor response message may include a public key 634 of the sending node. For additional protection, it may also include a checksum of the public key 656. The keys (public/private) may be generated using RSA algorithm while the checksum of the public key may be generated using, for example, MD5 algorithm. The open-source utility "open-SSL" may be used to generate keys and checksum. They keys and checksum are usually generated once when a node first starts. To protect against man-in-the-middle (MITM) attacks, the message may include a 64-bit security field. In one embodiment, the eight bytes are derived from a proprietary algorithm. The inputs to the algorithm may include a device key and a MAC address of the sending node.

As shown in FIG. 8A, during a network discovery phase, a new node 702 sends broadcast messages to each open mesh network on each channel in an attempt to find a WHMN for a predetermined OEM of the node. If the node receives a neighbor discovery message on its broadcast port, it may respond with a neighbor response message. The neighbor response message contains unique parameters about the network. These unique parameters are encoded in a proprietary format so that only OEM devices can decode and use the messages to establish a connection with an existing WHMN. Following network discovery, the node can send a connection request message with necessary network parameters and connection phrase. If the parameters are correct and properly received, the neighboring node responds with a connection confirmation message.

Referring again to FIG. 1, the various links between tier 2 nodes, such as flat-panel TVs 130, 131, and 132, gaming console 140, and desktop computer 150 may provide a backhaul 170 of home network 100. As indicated above, this backhaul of the network may route, for example, high definition (HD) video content to provide a television-centric network. In a television-centric network where content stored, for example, on TV 130 may be routed within home network 100 and displayed on any of TVs 131-132, and/or provided to desktop computer 150 or gaming console 140. Hence, regardless of the location within home network 100, content may be routed to any desired tier 2 device.

Furthermore, access to external networks via tier 1 devices 110, such as gateway node 120, is provided. For example, a user in the back yard, using laptop computer 166, may establish a link with gaming console 140 to join home network 100. Based on joining of the network, this user may access gateway node 120 via a multi-hop path including game console 140, digital television 132, desktop computer 150, and backhaul link 170. Similarly, a portable media player 168 may be loaded with content that is streamed from gaming console 140.

Hence, in addition to network extension capabilities, home network 100 may enable access from various tier 3 devices including handheld video recorder 162, portable media player 168, or the like, to stream content from such devices throughout the network. In addition, tier 3 devices (160-169) can load content within, for example, a media player 168 which is outside of home network 100. In the embodiments described the various tier 2 or 3 devices may be from the same OEM, such as Sony® Electronics. However, other non-OEM devices may be enabled for joining and accessing home network 100. Accordingly, such devices, once activated, automatically form a wireless mesh network with minimal user interaction beyond selection of desired networks, creation of additional networks, or password information for network authentication.

Alternate Embodiments

Several aspects of one implementation of the wireless home mesh network for providing improved home electronic device connectivity are described. However, various implementations of the wireless home mesh network provide numerous features including, complementing, supplementing, and/or replacing the features described above. Features can be implemented as part of the access point or as part of the wireless devices in different embodiment implementations. In addition, the foregoing description, for purposes of explanation, used specific nomenclature to provide a thorough understanding of the embodiments of the invention. However, it will be apparent to one skilled in the art that the specific details are not required in order to practice the embodiments of the invention.

It is to be understood that even though numerous characteristics and advantages of various embodiments of the present invention have been set forth in the foregoing description, together with details of the structure and function of various embodiments of the invention, this disclosure is illustrative only. In some cases, certain subassemblies are only described in detail with one such embodiment. Nevertheless, it is recognized and intended that such subassemblies may be used in other embodiments of the invention. Changes may be made in detail, especially matters of structure and management of parts within the principles of the embodiments of the present invention to the full extent indicated by the broad general meaning of the terms in which the appended claims are expressed.

Having disclosed exemplary embodiments and the best mode, modifications and variations may be made to the disclosed embodiments while remaining within the scope of the embodiments of the invention as defined by the following claims.

What is claimed is:

1. A method comprising:
receiving, by a stationary node of a wireless home mesh network (WHMN), a discovery request including credential information from an electronics device, wherein credential information includes a secret key combined with an extended service set identification (ESSID) of a network;
verifying, by the stationary node, credential information received from the electronics device to determine if the electronics device is one of a mobile node and a stationary node of the WHMN, wherein the electronics device is verified as one of the mobile node and the stationary node of the WHMN if the credential information is determined by the stationary node as being proprietary to the WHMN, wherein the credential information is recognizable by nodes that are included in the WHMN when the credential information is proprietary to WHMN; and
if the credential information is verified by the stationary node to establish the electronics device as one of a mobile node and a stationary node of the WHMN, unicasting a discovery response to the electronics device.

2. The method of claim 1, comprising:
establishing a wireless link with a mobile electronics device to join the mobile electronics device to the WHMN as a mobile node;
sharing services and content with the mobile node; and
providing access to a wired network via the wireless link with the mobile node.

3. The method of claim 2, further comprising:
receiving a request for high definition (HD) video stored within a stationary node; and
streaming the HD video via a backhaul of stationary nodes over the WHMN.

* * * * *